United States Patent
Miyama

(10) Patent No.: US 10,114,394 B2
(45) Date of Patent: Oct. 30, 2018

(54) INFORMATION PROCESSING APPARATUS, CONNECTION DEVICE, COMMUNICATION DEVICE, INFORMATION PROCESSING METHOD, AND PROGRAM

(71) Applicant: Sony Corporation, Tokyo (JP)

(72) Inventor: Seiji Miyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 13/896,386

(22) Filed: May 17, 2013

(65) Prior Publication Data

US 2013/0317660 A1 Nov. 28, 2013

(30) Foreign Application Priority Data

May 25, 2012 (JP) ................................. 2012-119601

(51) Int. Cl.
*G05D 3/12* (2006.01)
*G05F 1/66* (2006.01)
*H04B 3/54* (2006.01)

(52) U.S. Cl.
CPC ............... *G05F 1/66* (2013.01); *H04B 3/542* (2013.01); *H04B 3/544* (2013.01); *H04B 2203/5408* (2013.01)

(58) Field of Classification Search
CPC ......... H04L 12/10; H04L 41/12; G06F 1/189; G06F 1/26; G06F 1/266; G06F 1/3206; G06F 21/81; G06F 2221/2129; G06F 1/263; G05B 15/02; H02J 3/14; Y10T 307/391; Y10T 307/406; Y10T 307/477
See application file for complete search history.

(56) References Cited

U.S. PATENT DOCUMENTS

| | | | | |
|---|---|---|---|---|
| 6,222,853 B1* | 4/2001 | Marttinen | ........... | H02J 13/0079 340/3.1 |
| 6,954,797 B1* | 10/2005 | Takeda | .................... | H04L 29/06 709/226 |
| 7,657,763 B2* | 2/2010 | Nelson | ................ | H02J 13/0013 323/234 |
| 8,258,743 B2* | 9/2012 | Tyler | ................... | B60L 11/1816 320/104 |

(Continued)

FOREIGN PATENT DOCUMENTS

| | | |
|---|---|---|
| JP | 2008-245441 A | 10/2008 |
| JP | 2008-263712 A | 10/2008 |

(Continued)

*Primary Examiner* — Darrin D Dunn
(74) *Attorney, Agent, or Firm* — Wolf, Greenfield & Sacks, P.C.

(57) ABSTRACT

There is provided an information processing apparatus, including a reception section which receives, from a connection device having a connection terminal, entry information in which connection device identification information for identifying the connection device and communication device identification information for identifying a communication device connected to the connection terminal are associated with each other, a control section which acquires connection device information related to the connection device based on the entry information, and a transmission section which transmits the connection device information to the communication device indicated by the communication device identification information.

4 Claims, 13 Drawing Sheets

(56) References Cited

U.S. PATENT DOCUMENTS

| | | | |
|---|---|---|---|
| 8,564,403 B2* | 10/2013 | Landau-Holdsworth | B60L 3/0069 340/5.2 |
| 8,604,914 B2* | 12/2013 | Clarke | H02J 3/14 200/51.02 |
| 8,924,746 B2* | 12/2014 | Yamamoto | G06F 1/28 307/29 |
| 9,085,241 B2 | 7/2015 | Asano | B60L 11/1809 713/300 |
| 2002/0038153 A1* | 3/2002 | Amodeo | G08B 13/1418 700/1 |
| 2003/0041161 A1* | 2/2003 | Billings | H04L 12/44 709/231 |
| 2003/0078997 A1* | 4/2003 | Franzel | G06F 13/00 709/220 |
| 2004/0242087 A1* | 12/2004 | Hoshina | H01R 27/02 439/894 |
| 2006/0038660 A1* | 2/2006 | Doumuki | H04B 3/542 380/42 |
| 2006/0190538 A1* | 8/2006 | Hwang | H04L 12/2809 709/204 |
| 2007/0164704 A1* | 7/2007 | McGinley | H01R 13/6658 320/114 |
| 2008/0294558 A1* | 11/2008 | Shimanuki | G06Q 20/10 705/44 |
| 2009/0096592 A1* | 4/2009 | Wu | H04B 3/542 307/66 |
| 2009/0144150 A1* | 6/2009 | Sakakibara | B60L 11/123 705/14.62 |
| 2009/0263999 A1* | 10/2009 | Onoue | H01R 13/713 439/215 |
| 2009/0273334 A1* | 11/2009 | Holovacs | G06F 1/266 324/66 |
| 2010/0005048 A1* | 1/2010 | Bodapati | G06F 17/30303 706/47 |
| 2010/0045232 A1* | 2/2010 | Chen | B60L 3/0069 320/109 |
| 2010/0141203 A1 | 6/2010 | Graziano et al. | |
| 2010/0145568 A1* | 6/2010 | Watanabe | G07C 5/085 701/29.6 |
| 2010/0145885 A1* | 6/2010 | Graziano | B60L 11/1816 705/412 |
| 2010/0237985 A1* | 9/2010 | Landau-Holdsworth | B60L 3/0069 340/5.8 |
| 2010/0241560 A1* | 9/2010 | Landau-Holdsworth | B60L 3/0069 705/39 |
| 2010/0274725 A1* | 10/2010 | Holbery | G06Q 20/102 705/63 |
| 2010/0306033 A1* | 12/2010 | Oved | G06Q 10/06375 705/7.37 |
| 2011/0015795 A1* | 1/2011 | Boyer | G06F 1/266 700/286 |
| 2011/0047188 A1* | 2/2011 | Martins | G06K 19/07749 707/803 |
| 2011/0057513 A1* | 3/2011 | Menas | G06F 1/266 307/31 |
| 2012/0059531 A1* | 3/2012 | Marivoet | H02J 3/14 700/296 |
| 2012/0060044 A1* | 3/2012 | Jonsson | G01D 4/002 713/340 |
| 2012/0089263 A1* | 4/2012 | Park | H02J 13/001 700/291 |
| 2012/0306661 A1* | 12/2012 | Xue | G05B 19/042 340/870.02 |
| 2013/0041730 A1* | 2/2013 | LoBianco | G09F 13/00 705/14.4 |
| 2013/0162650 A1* | 6/2013 | Marivoet | H02J 3/14 345/440 |

FOREIGN PATENT DOCUMENTS

| | | |
|---|---|---|
| JP | 2009-141991 A | 6/2009 |
| JP | 2009-199443 A | 9/2009 |

* cited by examiner

| DEVICE ID | OUTLET ID | UPDATE TIME |
|---|---|---|
| 153 | 21 | 2012/03/28 15:28:31 |
| 298 | 191 | 2012/03/14 18:01:20 |
| 813 | 182 | 2012/01/03 11:40:21 |

| OUTLET ID | PRESENTATION INFORMATION |
|---|---|
| 21 | ... |
| 191 | ... |
| 182 | ... |

INFORMATION PROCESSING APPARATUS, CONNECTION DEVICE, COMMUNICATION DEVICE, INFORMATION PROCESSING METHOD, AND PROGRAM

BACKGROUND

The present disclosure relates to an information processing apparatus, a connection device, a communication device, an information processing method, and a program.

JP 2010-284039A and JP 2010-284040A both disclose technologies which manage a power supply to a user. In these technologies, when a user connects a plug to an outlet, the power supply to the user is controlled.

SUMMARY

However, the above described technologies do not provide the user with any information related to the outlet. Accordingly, technology has been demanded which can provide the user with information related to a connection device such as an outlet.

According to an embodiment of the present disclosure, there is provided an information processing apparatus, including a reception section which receives, from a connection device having a connection terminal, entry information in which connection device identification information for identifying the connection device and communication device identification information for identifying a communication device connected to the connection terminal are associated with each other, a control section which acquires connection device information related to the connection device based on the entry information, and a transmission section which transmits the connection device information to the communication device indicated by the communication device identification information.

According to an embodiment of the present disclosure, there is provided a connection device including a connection terminal, and a transmission section which transmits, to an information processing apparatus, entry information in which connection device identification information for identifying the connection device and communication device identification information for identifying a communication device connected to the connection terminal are associated with each other.

According to an embodiment of the present disclosure, there is provided a communication device including a second connection terminal capable of connecting to a first connection terminal of a connection device, a first communication section which transmits, to the connection device, communication device identification information for identifying the communication device when the second connection terminal is connected to the first connection terminal, and a second communication section which receives, from an information processing apparatus, connection device information related to the connection device.

According to an embodiment of the present disclosure, there is provided an information processing method, including receiving, from a connection device having a connection terminal, entry information in which connection device identification information for identifying the connection device and communication device identification information for identifying a communication device connected to the connection terminal are associated with each other, acquiring connection device information related to the connection device based on the entry information, and transmitting the connection device information to the communication device indicated by the communication device identification information.

According to an embodiment of the present disclosure, there is provided a program for causing a computer to implement a reception function which receives, from a connection device having a connection terminal, entry information in which connection device identification information for identifying the connection device and communication device identification information for identifying a communication device connected to the connection terminal are associated with each other, a control function which acquires connection device information related to the connection device based on the entry information, and a transmission function which transmits the connection device information to the communication device indicated by the communication device identification information.

According to the embodiment of the present disclosure, the connection device information related to the connection device can be transmitted to the communication device.

According to the embodiments of the present disclosure as described above, since the connection device information related to the connection device can be transmitted to the communication device, the connection device information can be provided to a user of the communication device.

DETAILED DESCRIPTION OF THE EMBODIMENT(S)

Figure 1:
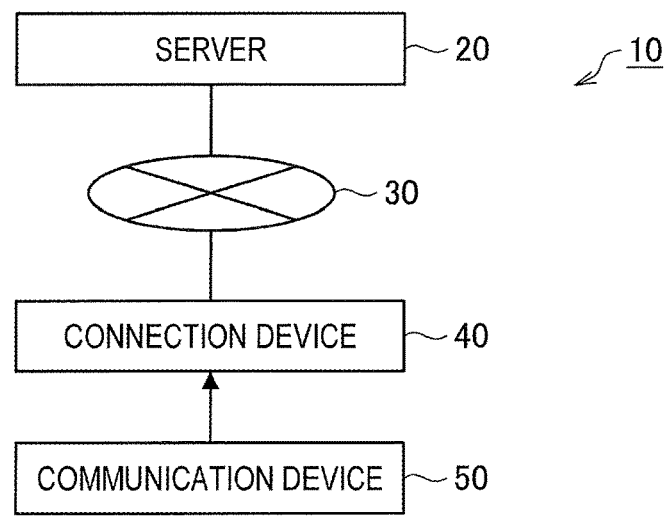
FIG. 1 is a block diagram which shows a configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. The First Embodiment (Example in which the connection device and the communication device perform power line communication)
  1-1. Entire configuration
  1-2. Configuration of the server
  1-3. Configuration of the connection device
  1-4. Configuration of the communication device
  1-5. Procedure of processes by the information processing system
2. The Second Embodiment (Example in which the connection device and the communication device perform non-contact communication)
  2-1. Configuration of the server
  2-2. Configuration of the connection device
  2-3. Configuration of the communication device <1. The First Embodiment>

[1-1. Entire Configuration]

First, the entire configuration of an information processing system 10 according to a first embodiment will be described based on FIG. 1.

Figures 3, 4, 5:
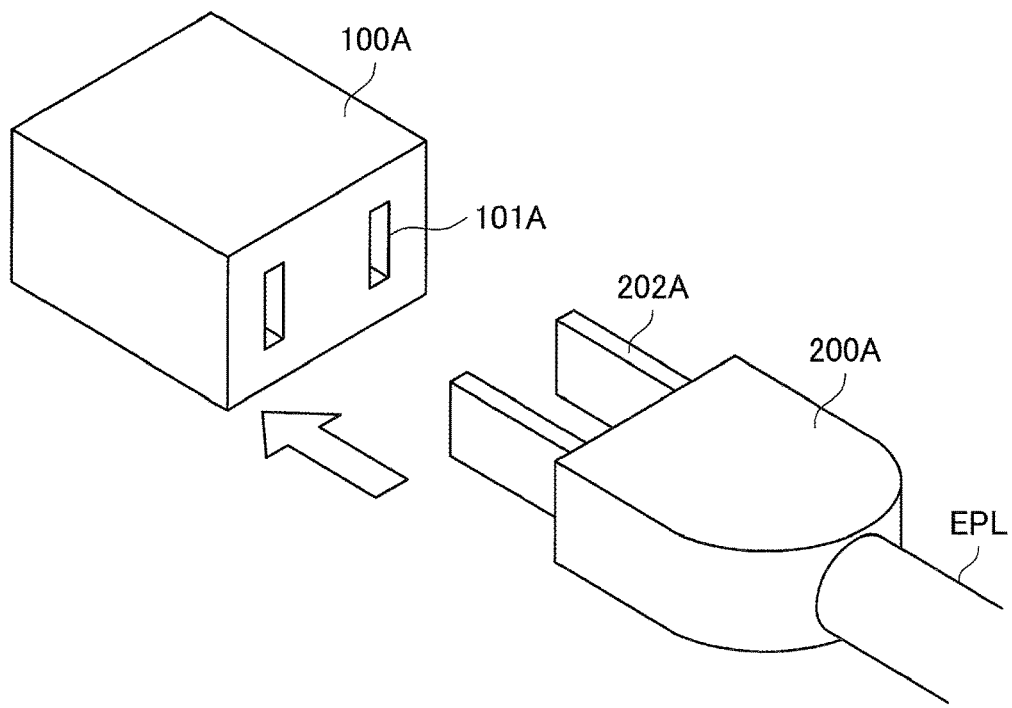
FIG. 3 is an explanatory diagram which shows an example of entry information stored in the server.
FIG. 4 is an explanatory diagram which shows an example of presentation information stored in the server.
FIG. 5 is a perspective diagram which shows a state in which an outlet and plug are connected.
Figure 6:
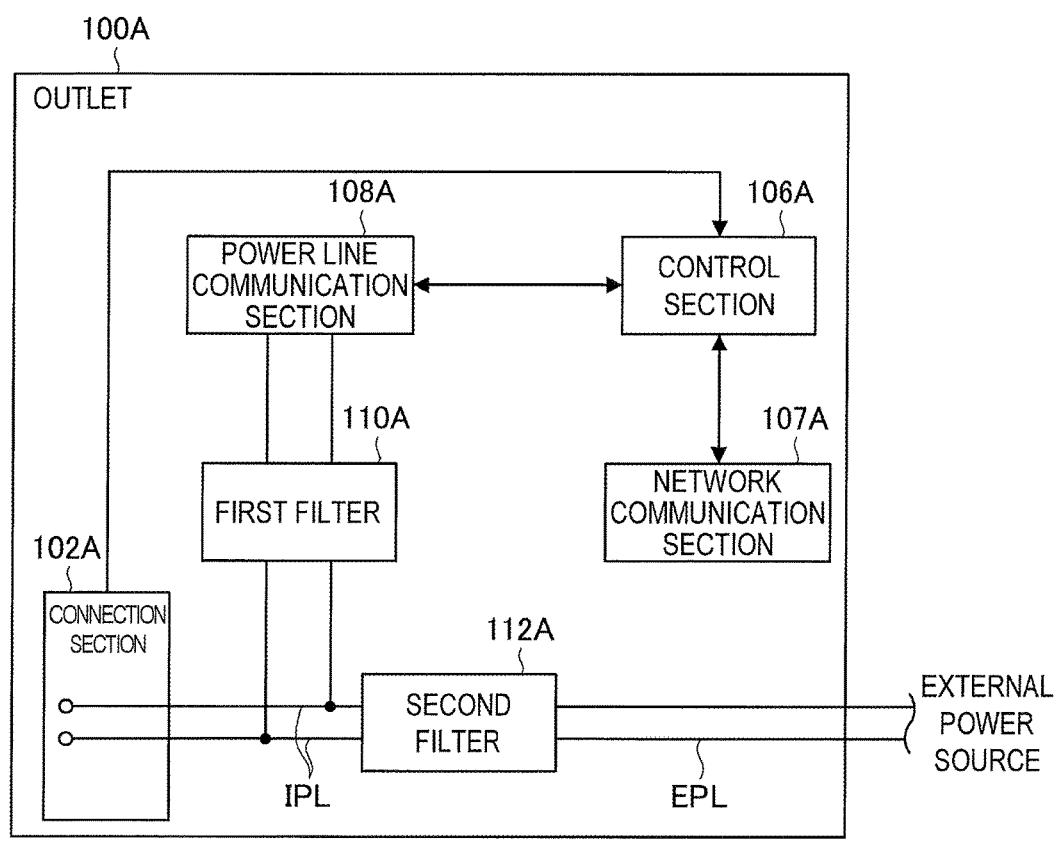
FIG. 6 is a block diagram which shows an internal configuration of the outlet.
Figure 10:
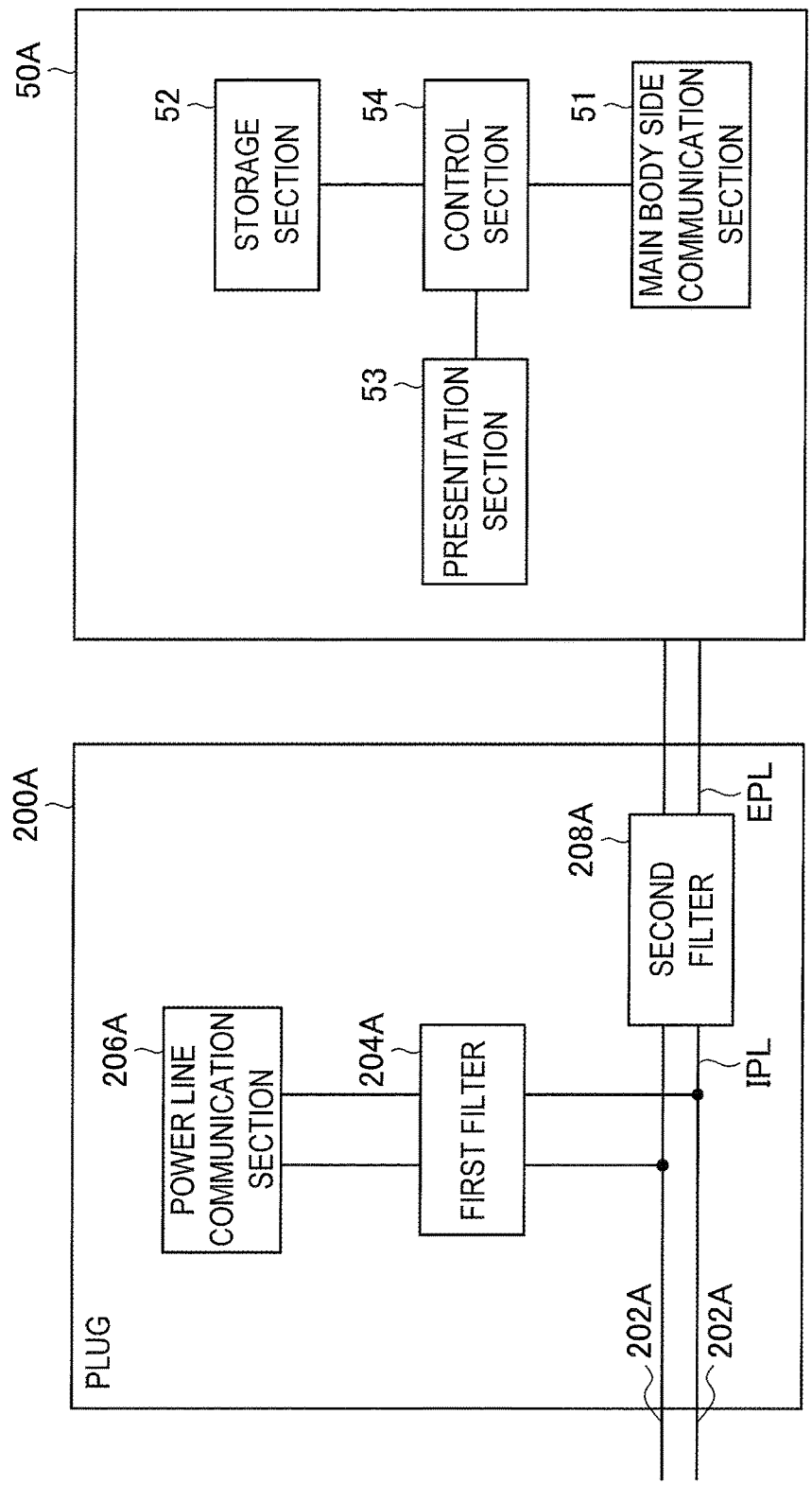
FIG. 10 is a block diagram which shows an internal configuration of a communication device.

The information processing system 10 includes server 20, a communication network 30, a connection device 40, and a communication device 50. The server 20 is capable of communicating with the connection device 40 via the communication network 30. In the first embodiment, the connection device 40 includes an outlet 100A, which is shown in FIG. 5. Further, the communication device 50 includes a communication device main body (such as a notebook computer) 50A, and a plug 200A, as shown in FIGS. 5 and 10.

In this information processing system 10, the following processes are generally performed. First, a user connects the plug 200A to the outlet 100A. Then, the plug 200A transmits its own device ID (communication device identification information) to the outlet 100A by power line communication. The outlet 100A transmits, to the server 20, entry information in which its own outlet ID (connection device identification information, connection device information) and the device ID are associated with each other.

On the other hand, when the plug 200A is connected to the outlet 100A, power from an external power source is supplied to the communication device main body 50A. The communication device main body 50A detects that the plug 200A is connected to the outlet 100A, by detecting power from the external power source. Then, the communication device 50 establishes a communication route to the server 20 and makes an inquiry (request) for the outlet ID, by performing so-called polling (push). Specifically, the communication device main body 50A transmits inquiry information, which includes its own device ID, to the server 20 at prescribed intervals. Note that the communication device 50 may request the outlet ID by polling to the server 20, or the server 20 may push transmit the outlet ID to the communication device 50.

The server 20 specifies the outlet 100A to which the communication device 50 is connected, based on the communication device identification information included in the inquiry information, and the entry information, and transmits the connection device identification information of the outlet 100A to the communication device main body 50A.

The communication device main body 50A requests presentation information (connection device information) from the server 20. Specifically, the communication device main body 50A transmits, to the server 20, request information which includes the outlet ID. The server 20 transmits, to the communication device main body 50A, presentation information corresponding to the outlet ID. Here, the presentation information is information related to the outlet 100A, such as accounting information, for example. The communication device main body 50A presents the user with the presentation information. In this way, the information processing system 10 can provide the user with information related to the outlet 100A.

[1-2. Configuration of the Server]

Figure 2:
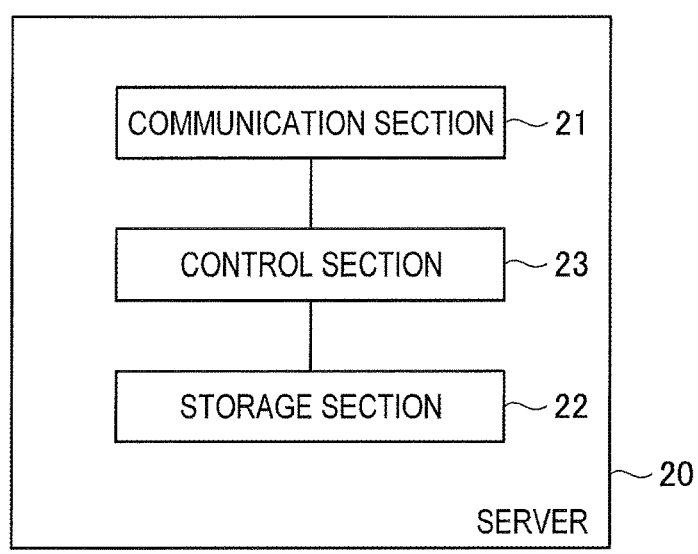
FIG. 2 is a block diagram which shows a configuration of a server according to the first embodiment.

Next, the configuration of the server 20 will be described based on FIG. 2. The server 20 includes a communication section (transmission section, reception section) 21, a storage section 22, and a control section 23. That is, the server 20 has a hardware configuration such as a CPU, ROM, RAM, hard disk, and communication apparatus. A program for implementing the functions of the communication section 21, storage section 22 and control section 23 in the server 20 is recorded in the ROM. The CPU reads out and executes the program recorded in the ROM. Therefore, the functions of the communication section 21, storage section 22 and control section 23 are implemented by this hardware configuration.

The communication section 21 communicates with the outlet 100A and the communication device 50 via the communication network 30. The storage section 22 stores the entry information and presentation information in addition to the above described program.

FIG. 3 shows an example of the entry information stored in the storage section 22. The storage section 22 stores the entry information and reception time (update time) information in association with each other. Here, a reception time shows the time when the communication section 21 receives the entry information.

FIG. 4 shows an example of the presentation information stored in the storage section 22. The storage section 22 stores the outlet ID and the presentation information in association with each other. Here, the presentation information is various types of information related to the outlet 100A, and is presented to the user by the communication device main body 50A. The presentation information may be any type of information.

For example, accounting information, authentication information, bulletin board information, advertising information or the like can be included as the presentation information. Accounting information is, for example, a billing amount per unit power amount. Authentication information is, for example, setting information of a wireless LAN. Bulletin board information is, for example, information created in a facility where the outlet 100A is installed. Similarly, advertising information is, for example, advertising information related to the facility where the outlet 100A is installed and the facilities surrounding this. In this way, presentation information related to the location where the outlet 100A is installed may by associated with the outlet ID. Since the outlet 100A is installed in some location, the outlet ID becomes information similar to that of position information, such as GPS information. Therefore, the above described presentation information can be associated with the outlet ID.

Note that the same presentation information may be associated with a plurality of types of outlet IDs. This is because there are cases where a plurality of outlets 100A are installed within the same facility. Further, the presentation information may be stored in a separate server. In this case, the storage section 22 stores the outlet ID and an address of the separate server in association with each other.

The control section 23 performs, for example, the following processes in addition to controlling each component of the server 20. That is, in the case where inquiry information is received from the communication device main body 50A, the control section 23 acquires an outlet ID and reception time information corresponding to the inquiry information. Then, the control section 23 transmits, to the communication device main body 50A, outlet ID notification information in which this outlet ID and reception time information are associated with each other. Further, in the case where request information is provided from the communication device main body 50A, the control section 23 transmits, to the communication device main body 50A, presentation information corresponding to the request information. Note that in the case where the storage section 22 stores addresses of separate servers instead of the presentation information, the control section 23 transmits, to the communication device main body 50A, an address corresponding to the request information.

[1-3. Configuration of the Connection Device]

Next, the configuration of the connection device 40, that is, the outlet 100A, will be described based on FIGS. 5 to 9. The outlet 100A is capable of attaching to and detaching from the plug 200A of the communication device 50. The outlet 100A includes a connection section 102A, a control section 106A, a network communication section (transmission section) 107A, a power line communication section 108A, a first filter 110A, a second filter 112A, an internal power line IPL, and an external power line EPL. The outlet 100A can perform, for example, power line communication with the plug 200A.

The connection section 102A includes an opening section 101A (connection terminal, first connection terminal), which is shown in FIG. 5. This opening section 101A is connected to the internal power line IPL. Note that when the plug 200A is connected, the connection section 102A may transmit a connection configuration signal to the control section 106A. The internal power line IPL connects the connection section 102A to the second filter 112A.

The control section 106A includes an integrated circuit or the like in which an MPU (Micro Processing Unit) and various processing circuits are integrated. More specifically, the control section 106A stores an ID of the outlet 100A, that is, the outlet ID. Further, the control section 106A transmits a high frequency signal generation instruction and a high frequency signal transmission suspension instruction to the power line communication section 108A, and performs various types of processes, based on a high frequency response signal transmitted from the power line communication section 108A. Here, information for requesting the device ID is included in the high frequency signal. Further, information related to the device ID is included in the high frequency response signal. The control section 106A performs generation or the like of entry information, based on the high frequency response signal. Note that when a connection confirmation signal is provided from the connection section 102A, the control section 106A may transmit the high frequency signal generation instruction to the power line communication section 108A.

While at least one of 130-135 kHz, 13.56 MHz, 56 MHz, 433 MHz, 954.2 MHz, 954.8 MHz, 2441.75 MHz, or 2448.875 MHz, for example, can be included as frequencies of the high frequency signal and the high frequency response signal, the frequencies of the high frequency signals according to the present embodiment are not limited to those described above. However, it is preferable that the frequencies of the high frequency signals are at least different to the frequency of a power signal (for example, 50 or 60 Hz).

The network communication section 107A includes various types of communication apparatuses, and communicates with the server 20 via the communication network 30.

Figure 7:
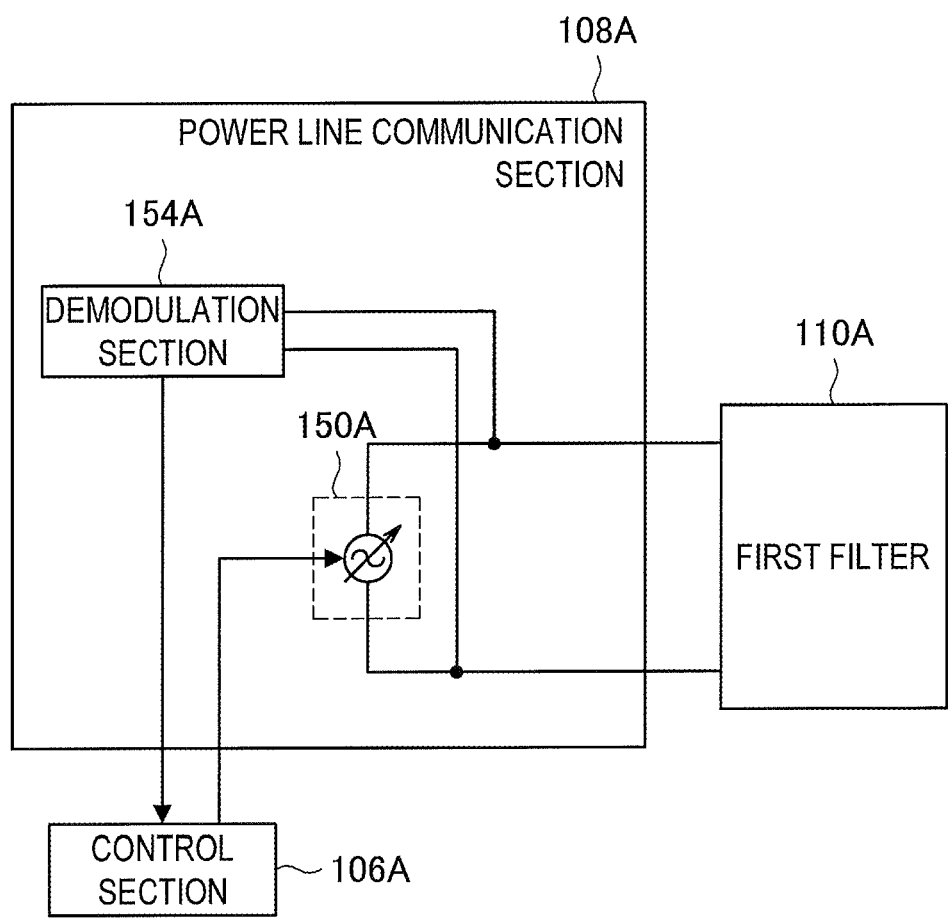
FIG. 7 is a block diagram which shows an internal configuration of the outlet.

The power line communication section 108A performs power line communication with the plug 200A, and functions as a reader/writer (or interrogator) in NFC or the like. A specific configuration of the power line communication section 108A is shown in FIG. 7. The power line communication section 108A includes a high frequency signal generation section 150A, and a demodulation section 154A. Further, the power line communication section 108A may further include, for example, an encryption circuit (not shown in the figures), a communication collision avoidance (anti-collision) circuit or the like.

The high frequency signal generation section 150A receives the high frequency signal generation instruction transmitted from the control section 106A, and generates a high frequency signal in accordance with the high frequency signal generation instruction. Further, the high frequency signal generation section 150A receives the high frequency signal transmission suspension instruction, which shows a transmission suspension of the high frequency signal, for example, transmitted from the control section 106A, and suspends the generation of the high frequency signal.

The demodulation section 154A performs, for example, envelope detection of an amplitude change of the voltage between the high frequency signal generation section 150A and the first filter 110A, and demodulates the high frequency response signal transmitted from the plug 200A, by binarizing the detected signal. Then, the demodulation section 154A transmits the demodulated high frequency response signal to the control section 106A. Note that the demodulation method of the high frequency response signal in the demodulation section 154A is not limited to that described above, and can demodulate the high frequency response signal by using, for example, a phase change of the voltage between the high frequency signal generation section 150A and the first filter 110A.

The first filter 110A is connected between the power line communication section 108A and the internal power line IPL, and functions so as to filter the signals transmitted from the internal power line IPL. More specifically, the first filter 110A has a function which interrupts the power signal and does not interrupt the high frequency signal and the high frequency response signal, from among the signals transmitted from the internal power line IPL. In this way, the first filter 110A is set so that the power signal, which can become noise in the power line communication section 108A, does not reach the power line communication section 108A.

Figure 8:
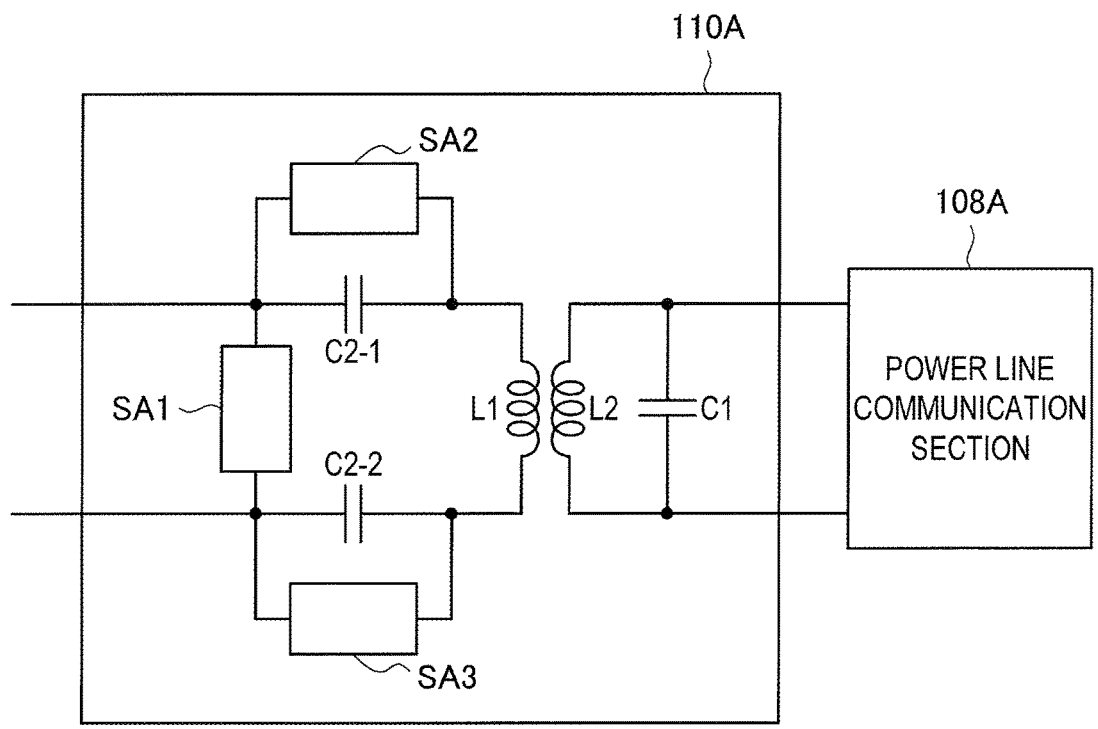
FIG. 8 is block diagram which shows an internal configuration of the outlet.

A specific configuration of the first filter 110A is shown in FIG. 8. The first filter 110A includes inductors L1 and L2, capacitors C1 to C2-2, and surge absorbers SA1 to SA3. Note that it is needless to say that the configuration of the first filter 104A according to the present embodiment is not limited to the configuration shown in FIG. 8.

The second filter 112A connects the internal power line IPL to the external power line EPL. The external power line EPL is connected to an external power source. The second filter 112A functions so as to filter the signals transmitted via the internal power line IPL. More specifically, the second filter 112A has a function which interrupts the high frequency response signal transmitted by the plug 200A and the high frequency signal transmitted by the power line communication section 108A, and does not interrupt the power signal supplied from the external power source.

Figure 9:
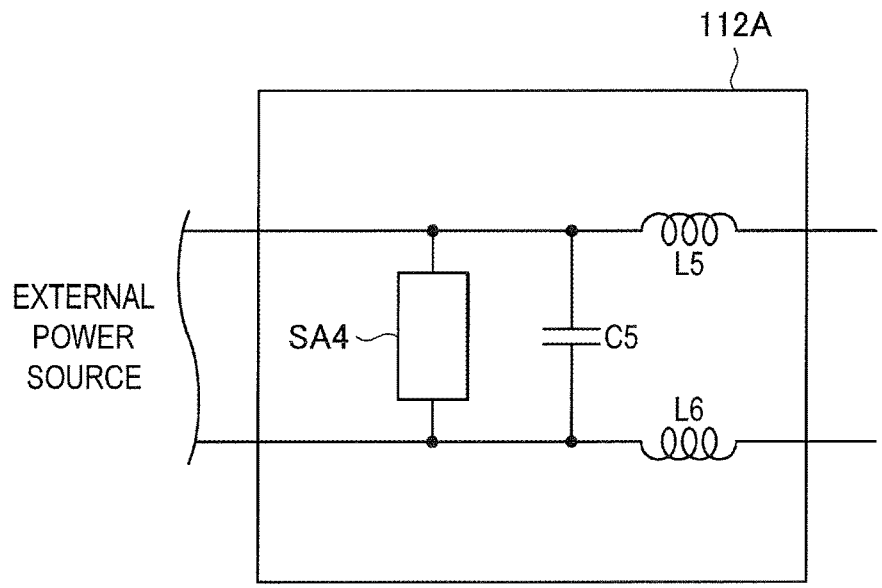
FIG. 9 is block diagram which shows an internal configuration of the outlet.

That is, when the plug 200A is connected to the outlet 100A, for example, the second filter 112A can transmit, to the communication device main body 50A, the power signal from the external power source. That is, the second filter 112A functions as a so-called power splitter. A specific configuration of the second filter 112A is shown in FIG. 9. The second filter 112A includes inductors L5 and L6, a capacitor C5, and a surge absorber SA4. Note that it is needless to say that the configuration of the second filter 112A according to the present embodiment is not limited to the configuration shown in FIG. 9.

Further, while the outlet 100A in the example shown in FIG. 5 has one opening section 101A, that is, a connection section 102A, it may have a plurality of connection sections 102A. In this case, the control section 106A stores a different outlet ID for each connection section 102A. Further, the control section 106A specifies the connection section 102A to which the plug 200A is connected, based on a connection confirmation signal. Then, the control section 106A acquires an outlet ID corresponding to the specified connection section 102A, and generates entry information in which this outlet ID and the device ID are associated with each other.

[1-4. Configuration of the Communication Device]

Next, the configuration of the communication device 50 will be described based on FIGS. 5, 10, and 11. The communication device 50 includes the plug 200A, the communication device main body 50A, and the external power line EPL connecting these.

The plug 200A includes a blade section (second connection terminal) 202A, a first filter 204A, a power line communication section 206A, a second filter 208A, and the internal power line IPL, as shown in FIGS. 5 and 10. The blade section 202A is capable of being inserted into the opening section 101A of the outlet 100A, and is connected to the internal power line IPL.

The first filter 204A is connected between the power line communication section 206A and the internal power line IPL, and functions so as to filter the signals transmitted from the internal power line IPL. More specifically, the first filter 204A has a function which interrupts the power signal and does not interrupt the high frequency signal and the high frequency response signal, from among the signals transmitted from the internal power line IPL. The specific configuration is similar to that of the first filter 110A.

The power line communication section 206A is driven by the high frequency signal from the outlet 100A. Also, the power line communication section 206A generates the high frequency response signal by load modulation, and transmits the high frequency response signal to the internal power line IPL. FIG. 11 is an explanatory figure which shows an example of the power line communication section 206A. Here, FIG. 11 also shows the first filter 204A. The power line communication section 206A demodulates and processes a received high frequency signal, and includes an IC chip 252 which transmits the high frequency response signal by load modulation. Note that the plug 200A according to the present embodiment may not include each of the components included in the IC chip 252 shown in FIG. 11 by the form of the IC chip.

The IC chip 252 includes a detection section 254, a detection section 256, a regulator 258, a demodulation section 260, a data processing section 262, and a load modulation section 264. Note that while not shown in FIG. 11, the IC chip 252 can further include, for example, a protection circuit (not shown in the figures) for preventing overvoltage and overcurrent from being applied to the data processing section 262. Here, for example, a clamp circuit including a diode or the like can be included as the protection circuit (not shown in the figures).

Further, the IC chip 252 includes a ROM 266, a RAM 268, an internal memory 270 or the like. The data processing section 262, ROM 266, RAM 268, and internal memory 270 are connected, for example, by a bus 272 as a transmission route of data.

The ROM 266 stores control data, such as programs and operation parameters used by the data processing section 262. The RAM 268 temporarily stores programs, operation results, execution states or the like executed by the data processing section 262.

The internal memory 270 is a storage section included in the IC chip 252, has, for example, a tamper resistant property, reads data by the data processing section 262 and performs writing of new data and updating of the data. For example, various data such as a device ID and electronic value, or application data, for example, is stored in the internal memory 270. Here, FIG. 11 shows an example in which the internal memory 270 stores a device ID 274 and an electronic value 276.

The detection section 254 generates, for example, a rectangular detection signal, based on the high frequency signal, and transmits this detection signal to the data processing section 262. Further, the data processing section 262 uses, for example, the above described transmitted detection signal as a processing clock for data processing. Here, since the above described detection signal is based on the high frequency signal transmitted from the outlet 100A, it will become synchronized with the frequency of this high frequency signal. Therefore, by including the detection section 254, the IC chip 252 can perform processing with the outlet 100A synchronized with the outlet 100A.

The detection section 256 rectifies a voltage in accordance with a received high frequency signal (hereinafter, there will be cases where it is called a "reception voltage"). Here, while the detection section 256 can include a diode D1 and a capacitor C6, for example, the configuration of the detection section 256 is not limited to that described above.

The regulator 258 smoothes and converts the reception voltage into a constant voltage, and transmits a driving voltage to the data processing section 262. Here, the regulator 258 can use the direct current component of the reception voltage as the driving voltage.

The demodulation section 260 demodulates the high frequency signal based on the reception voltage, and transmits data corresponding to the high frequency signal (for example, a data signal binarized with a high level and a low level). Here, the demodulation section 260 can transmit the alternating current component of the reception voltage as the data.

The data processing section 262 drives the driving voltage transmitted from the regulator 258 as a power source, and performs the processing of data demodulated in the demodulation section 260. Here, while the data processing section 262 can include an MPU, for example, the configuration of the data processing section 262 is not limited to that described above.

Further, the data processing section 262 selectively generates, according to the processing result, a control signal which controls the load modulation according to the response of the outlet 100A. Also, the data processing section 262 selectively transmits the control signal to the load modulation section 264.

The load modulation section 264 includes, for example, a load Z and a switch SW1, and performs load modulation by selectively connecting (activating) the load Z according to the control signal transmitted from the data processing section 262. Here, while the load Z includes a resistance having a prescribed resistance value, for example, the configuration of the load Z is not limited to that described above. Further, while the switch SW1 includes a p-channel type MOSFET or an n-channel type MOSFET, for example, the configuration of the switch SW1 is not limited to that described above.

By the configuration such as described above, the IC chip 252 can process the received high frequency signal, and can superimpose the high frequency response signal on the power line by load modulation and transmit the superimposed high frequency response signal. Note that it is needless to say that the configuration of the IC chip 252 according to the present embodiment is not limited to the configuration shown in FIG. 11.

Figure 11:
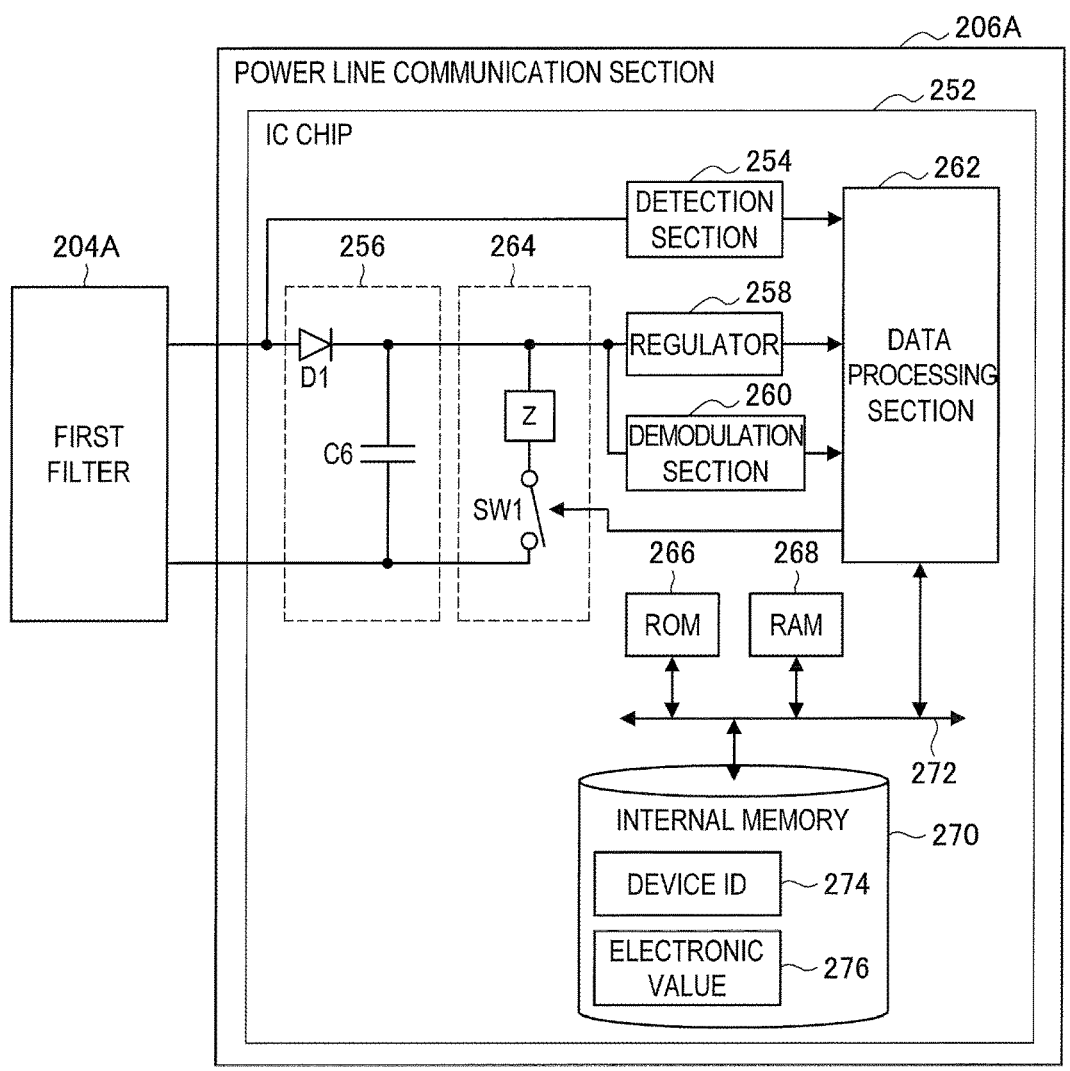
FIG. 11 is a block diagram which shows an internal configuration of the communication device.

By the configuration shown in FIG. 11, the power line communication section 206A can perform a process in which the received high frequency signal is shown by obtaining and driving the power from the received high frequency signal, and can transmit the high frequency response signal in accordance with this process by load modulation.

The second filter 208A connects the external power line EPL extended from an electronic device, which is not shown in the figures, to the internal power line IPL. The second filter 208A functions so as to filter the signals transmitted via the internal power line IPL. More specifically, the second filter 208A has a function which interrupts at least the high frequency signal transmitted by the outlet 100A and the high frequency response signal transmitted by the power line communication section 206A, and does not interrupt the power signal supplied via the internal power line IPL. That is, when the plug 200A is plugged into the outlet 100A, for example, the second filter 208A can transmit the power signal from the outlet 100A to the external power line EPL. That is, the second filter 208A functions as a so-called power splitter. The specific configuration of the second filter 208A is similar to that of the second filter 112A.

The communication device main body 50A may be any type of device having a communication function, and various types of personal computers (such as a desktop personal computer or notebook computer), a television apparatus, or an audio apparatus, for example, can be included as the communication device main body 50A.

The communication device main body 50A includes a main body side communication section (second communication section) 51, a storage section 52, a presentation section 53, and a control section 54. That is, the communication device main body 50A has a hardware configuration such as a CPU, ROM, RAM, hard disk, communication apparatus, and display. A program for implementing the functions of the main body side communication section 51, storage section 52, presentation section 53, and control section 54 in the communication device main body 50A is recorded in the ROM. The CPU reads out and executes the program recorded in the ROM. Therefore, the functions of the main body side communication section 51, storage section 52, presentation section 53, and control section 54 are implemented by this hardware configuration.

The main body side communication section 51 is connected to the communication network 30 via a wireless LAN router, for example, and communicates with the server 20 via the communication network 30. It is needless to say that the main body side communication section 51 may be connected to the communication network 30 by wires. The storage section 52 stores, for example, a device ID in addition to the above described program. The presentation section 53 presents, for example, presentation information. The control section 54 performs, for example, the following processes in addition to controlling each component of the communication device main body 50A. That is, the control section 54 detects that the plug 200A is connected to the outlet 100A, by detecting a power signal from the external power source. Further, the control section 54 transmits the above described inquiry information and request information from the server 20. Further, the control section 54 presents the presentation information to the presentation section 43. Further, in the case where an address of a separate server is provided instead of the presentation information, the control section 54 accesses the separate server and acquires the presentation information.

[1-5. Procedure of Processes by the Information Processing System]

Next, the procedures of processes by the information processing system will be described. Note that, in this example, the communication device main body 50A connects to the communication network 30 via a wireless LAN router, and the setting information of the wireless LAN is included in the presentation information. Further, in the initial state of the wireless LAN router (that is, a state prior to the setting of the wireless LAN being changed), the communication device main body 50A permits access only to the server 20. By a user performing settings corresponding to the setting information of the wireless LAN, the communication device main body 50A is capable of connecting, via the communication network 30, to communication devices other than the server 20. Further, the communication device main body 50A is started by the internal power source, even prior to the plug 200A being connected to the outlet 100A.

[Procedure of Processes by the Communication Device Main Body]

Figure 12:
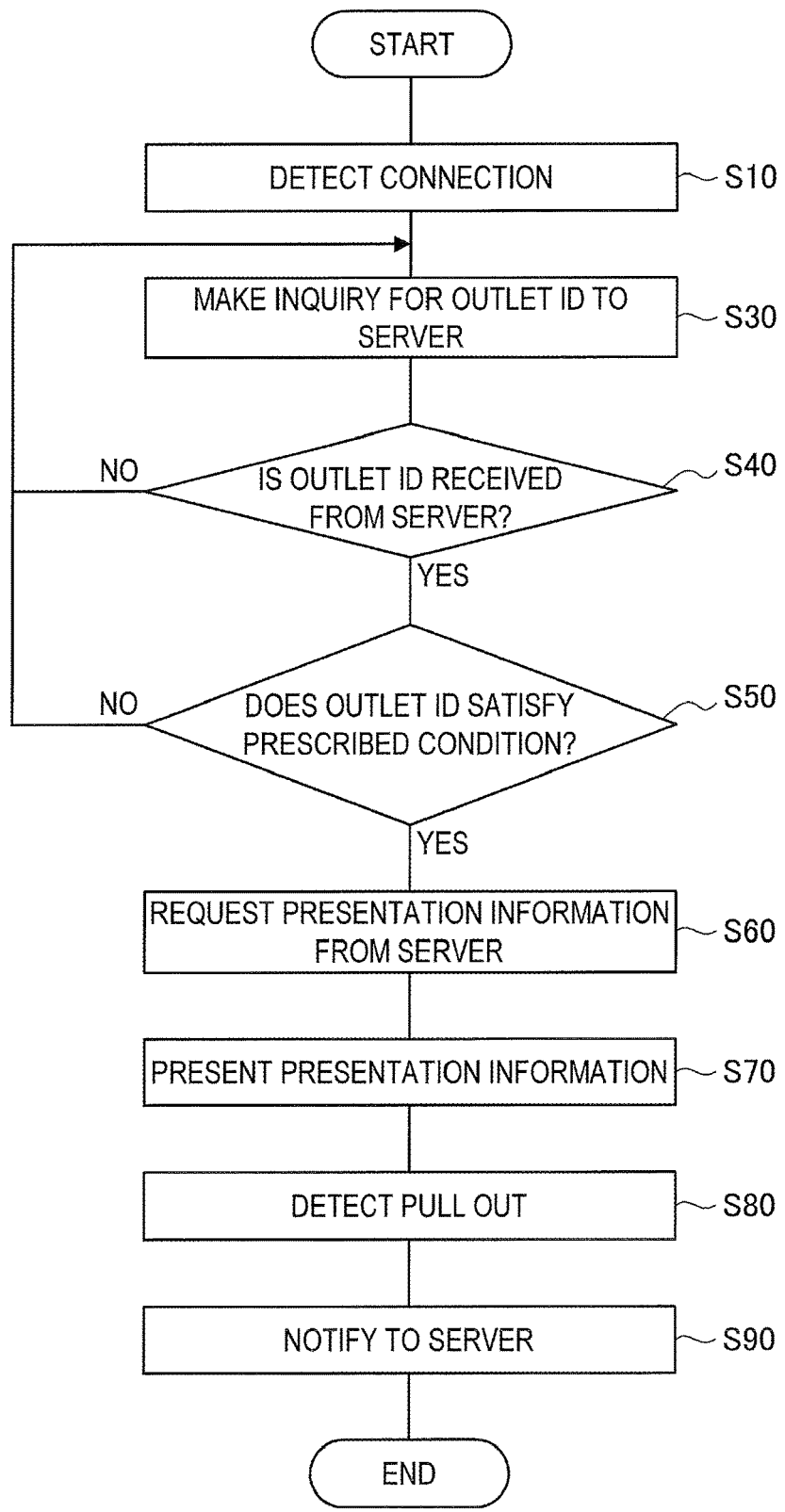
FIG. 12 is a flow chart which shows the procedure of processes by the communication device.

First, the procedure of processes by the communication device main body 50A will be described based on FIG. 12. In step S10, the user connects the plug 200A to the outlet 100A. Specifically, the user inserts the blade section 202A of the plug 200A into the opening section 101A of the outlet 100A. In this way, a power signal from the external power source is supplied to the communication device main body 50A via the external power line EPL. The control section 54 detects that the plug 200A is connected to the outlet 100A, by detecting the power signal from the external power source. The control section 54 stores, in the storage section 52, detection time information related to the detection time (time of detection).

In step S30, the communication device main body 50A establishes a communication route to the server 20, and makes an inquiry (request) for the outlet ID, by performing polling. Specifically, the control section 54 acquires a device ID of the communication device main body 50A from the storage section 52, and outputs the device ID to the main body side communication section 51. The main body side communication section 51 transmits inquiry information, which includes the device ID, to the server 20 at prescribed intervals.

In step S40, the main body side communication section 51 determines whether or not outlet ID notification information is received from the server 20. In the case where it is determined that outlet ID notification information is received from the server 20, the main body side communication section 51 outputs the outlet ID notification information to the control section 54, and proceeds to step S50. On the other hand, in the case where it is determined that outlet ID notification information is not received from the server 20, the main body side communication section 51 returns to step S30.

In step S50, the control section 54 determines whether or not the outlet ID satisfies a prescribed condition, based on the outlet ID notification information and the detection time information. Here, the prescribed condition is a condition (first condition) in which the reception time is after the detection time. In the case where it is determined that the outlet ID satisfies the prescribed condition, the control section 54 determines that the outlet ID is effective, and proceeds to step S60. On the other hand, in the case where it is determined that the outlet ID does not satisfy the prescribed condition, the control section 54 discards the outlet ID, and returns to step S30. In this way, the control section 54 can more surely acquire an outlet ID corresponding to the outlet 100A to which the plug 200A is connected.

Note that there is the possibility that the outlet 100A uploads the entry information to the server 20 prior to the control section 54 detecting the connection between the plug 200A and the outlet 100A. In this case, while the reception time becomes prior to the detection time, the outlet ID is effective. Accordingly, the prescribed condition may include a condition (second condition) in which the update time is a prescribed amount of time (for example, several milliseconds or seconds, more specifically, 0.05 seconds or the like) prior to the detection time. In this way, the control section 54 can determine that the outlet ID is effective, even if the reception time is a prescribed amount of time prior to the detection time.

In step S60, the control section 54 requests presentation information from the server 20. Specifically, the control section 54 generates request information for requesting presentation information, and outputs the request information from the main body side communication section 51. The outlet ID acquired in step S50 by the control section 54 is included in this request information. The main body side communication section 51 transmits the request information from the server 20. The main body side communication section 51 receives the presentation information transmitted from the server 20, and outputs the presentation information to the control section 54. Here, setting information of a wireless LAN, as described above, is included in the presentation information.

Note that the storage section 22 may store the outlet ID and the presentation information in association with each other. In this case, the control section 54 acquires presentation information corresponding to the outlet ID from the storage section 22. Therefore, the control section 54 can omit the process of step S60.

In step S70, the control section 54 presents the presentation information to the presentation section 53. In this way, the user can visually recognize the presentation information. The user updates the setting of the wireless LAN, based on the setting information of the wireless LAN included in the presentation information. In this way, the communication device main body 50A is capable of connecting, via the communication network 30, to communication devices other than the server 20. Further, in the case where accounting information, bulletin board information or the like is included in the presentation information, the user can visually recognize this information.

In step S80, the user pulls out the plug 200A from the outlet 100A. In this way, while the power signal from the external power source is not supplied to the communication device main body 50A, the communication device main body 50A is driven by the internal power source. Further, the control section 54 detects that the connection between the plug 200A and the outlet 100A is released, by detecting that the supply of the power signal has stopped.

In step S90, the control section 54 generates connection release information for releasing the connection between the plug 200A and the outlet 100A, and outputs the connection release information to the main body side communication section 51. Here, the device ID is included in the connection release information. The main body side communication section 51 transmits the connection release information to the server 20. That is, the communication device main body 50A notifies, to the server 20, that the connection between the plug 200A and the outlet 100A is released. After this, the communication device main body 50A ends the processes. Note that the processes of steps S80 to S90 may be omitted.

Figure 13:
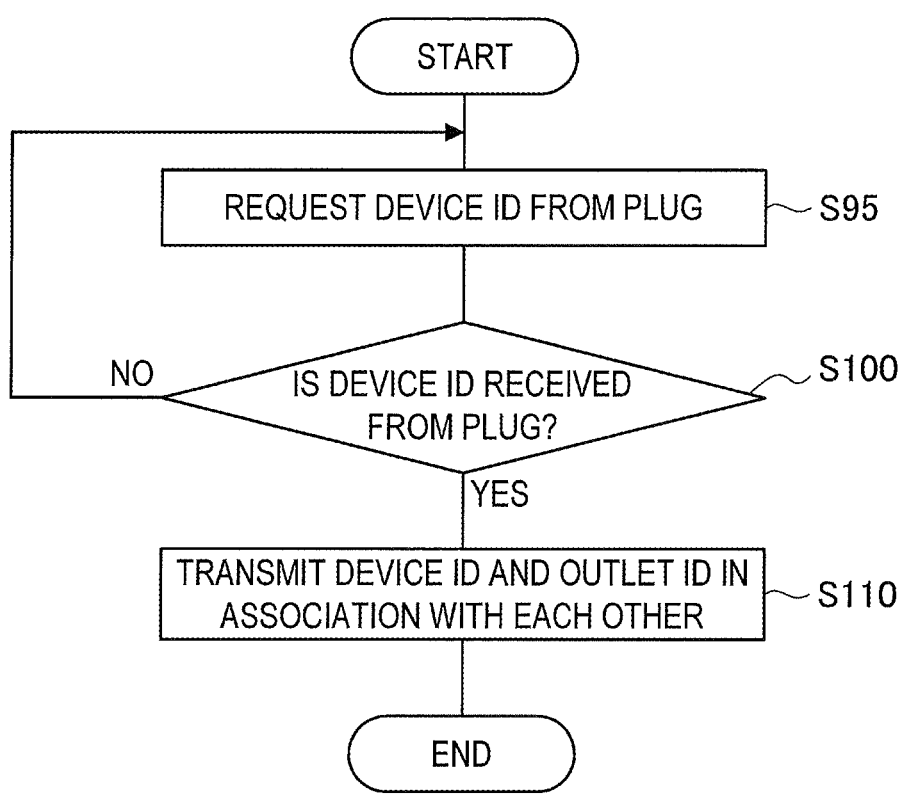
FIG. 13 is a flow chart which shows the procedure of processes by the outlet.

Next, the processes performed between the outlet 100A and the plug 200A will be described based on FIG. 13. When the user connects the plug 200A to the outlet 100A, the connection section 102A outputs a connection confirmation signal to the control section 106A.

In step S95, the control section 106A of the outlet 100A transmits, to the power line communication section 108A, a high frequency signal generation instruction for requesting the device ID. Note that in order to improve the possibly that it is determined that the outlet ID is effective, the control section 106A may standby for a prescribed amount of time (for example, several milliseconds or seconds) after the connection confirmation signal is provided (hereinafter, this process is called a standby process). Then, the control section 106A performs the standby process and thereafter transmits the high frequency signal generation instruction. In this way, since the outlet 100A transmits the entry information to the server 20 after at least a prescribed amount of time has elapsed after connecting with the plug 200A, the possibility that the prescribed condition is satisfied becomes higher.

In this way, in the present first embodiment, processes which include the second condition in the prescribed condition and a standby process may be performed as processes which improve the possibility that it is determined that the outlet ID is effective. These processes may both be performed, or only one of them may be performed.

In step S100, the control section 106A determines whether or not the device ID is provided from the plug 200A. In the case where it is determined that the device ID is provided from the plug 200A, the control section 106A proceeds to step S110, and in the case where it is determined that the device ID is not provided from the plug 200A, the control section 106A returns to step S95.

On the other hand, the power line communication section 108A generates a high frequency signal for requesting the device ID, and outputs the high frequency signal to the first filter 110A. The high frequency signal reaches the power line communication section 206A by passing through the first filter 110A, the internal power line IPL, and the first filter 204A.

The power line communication section 206A generates a high frequency response signal related to the device ID, and outputs the high frequency response signal to the first filter 204A. The high frequency response signal reaches the power line communication section 108A by passing through the first filter 204A, the internal power line IPL, and the first filter 110A. That is, the power line communication section 108A and the power line communication section 206A both perform power line communication. The power line communication section 206A outputs the high frequency response signal to the control section 106A.

In step S110, the control section 106A generates entry information in which the device ID and outlet ID are associated with each other, and outputs the entry information to the network communication section 107A. Note that the control section 106A may standby for a prescribed amount of time (for example, several milliseconds or seconds) after generating the entry information, and thereafter output the entry information to the network communication section 107A. That is, the control section 106A may perform a standby process similar to the standby process of step S95. The control section 106A may perform both the standby process of step S95 and the standby process of step S110, or may perform only one of them. By performing the standby process of step S110, the possibility that the prescribed condition is satisfied becomes higher. The network communication section 107A transmits the entry information to the server 20. On the other hand, the control section 106A performs various types of processes, for example, an accounting process (such as a process in which an electronic value within the power line communication section 206A is subtracted according to a use condition of a power signal by a user) using power line communication. After this, the outlet 100A and plug 200A end the processes.

Note that in the process of step S95, the control section 106A may transmit, to the power line communication section 108A, a high frequency signal generation instruction for notifying the outlet ID. In this case, the power line communication section 108A transmits a high frequency signal related to the outlet ID to the power line communication section 206A. In this case, the power line communication section 206A may transmit, for example, the outlet ID to the main body side communication section 51 by wireless communication or the like. In this way, it is possible for the processes of step S100 and step S110 to be omitted. Further, it is possible for the processes of steps S30 to S50 described above to also be omitted.

Figure 14:
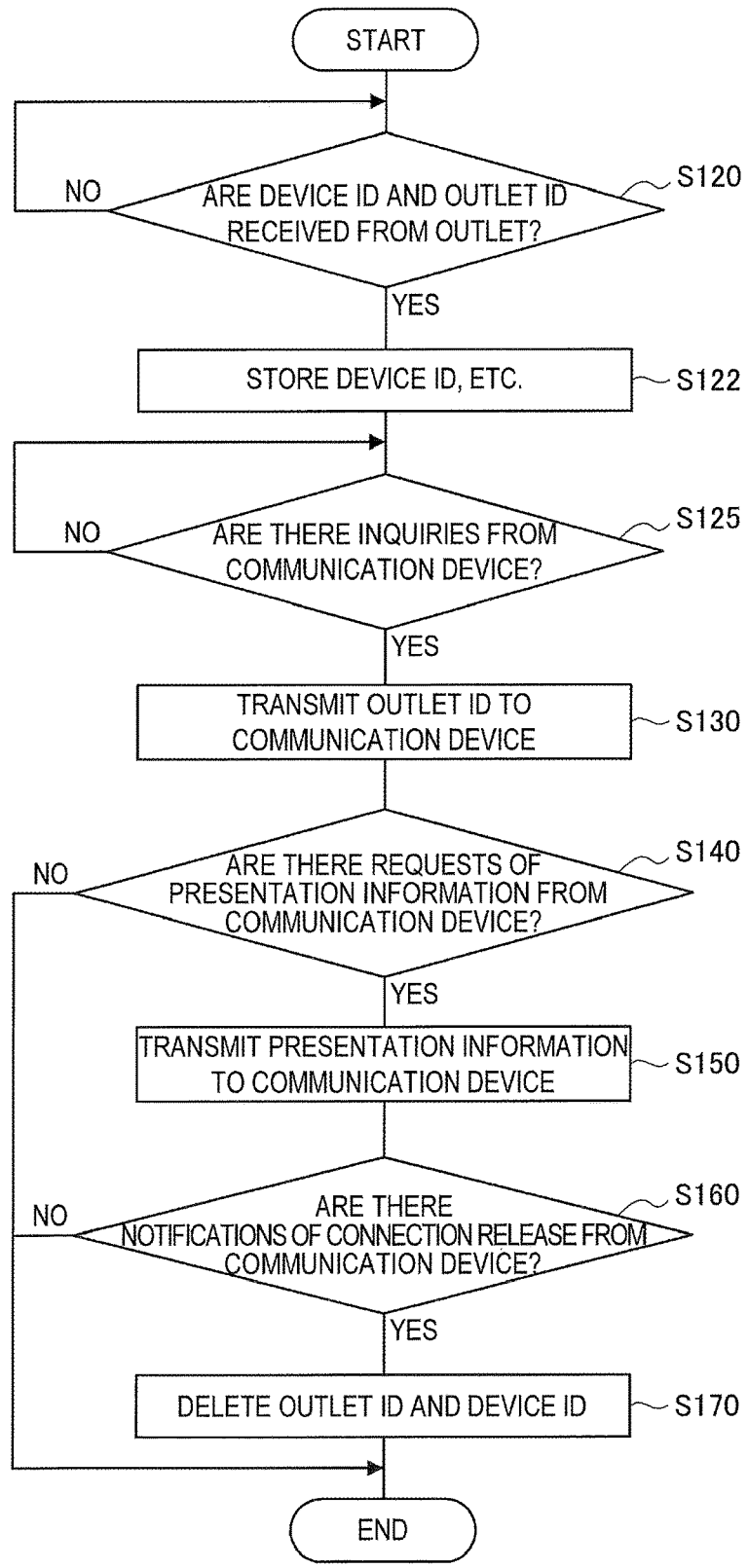
FIG. 14 is a flow chart which shows the procedure of processes by the server.

Next, the processes by the server 20 will be described based on FIG. 14. In step S120, the communication section 21 stands by until the entry information is received. In the case where the entry information is received, the communication section 21 outputs the entry information (hereinafter, called second entry information) and reception time information to the control section 23.

In step S122, the control section 23 stores, in the storage section 22, the second entry information and the reception time information in association with each other. Here, the control section 23 may perform the following processes. That is, the control section 23 compares the entry information already stored in the storage section 22 (hereinafter, called first entry information) with the second entry information. As a result, in the case where the second entry information has an outlet ID in common with the first entry information, and has a device ID different from the first entry information, the control section 23 deletes the first entry information from the storage section 22. In this case, this is because the plug 200A connected to the outlet 100A has changed.

In step S125, the control section 23 stands by until inquiry information is provided from the communication device main body 50A. On the other hand, in the case where inquiry information transmitted from the communication device main body 50A is received, the communication section 21 outputs request information from the control section 23. Note that even in the case where inquiry information is not provided, the control section 23 may transmit an outlet ID to the communication device main body 50A shown by the entry information.

In step S130, the control section 23 detects entry information corresponding to the inquiry information, that is, entry information in which the inquiry information and device ID match each other. Then, the control section 23 acquires an outlet ID (an ID showing the outlet 100A to which the plug 200A is presently connected) from the detected entry information. In addition, the control section 23 also acquires reception time information associated with the detected entry information. Then, the control section 23 generates outlet ID notification information in which the outlet ID and reception time information are associated with each other, and outputs the outlet ID notification information to the communication section 21. The communication section 21 transmits the outlet ID notification information to the communication device main body 50A.

Note that the control section 23 may directly provide the presentation information directly to the communication device main body 50A. Specifically, the control section 23 may perform the following processes. That is, the control section 23 detects entry information corresponding to the inquiry information, that is, entry information in which the inquiry information and device ID match each other, and acquires the outlet ID from this entry information. Then, the control section 23 acquires presentation information corresponding to the outlet ID from the storage section 22. Then, the control section 23 outputs the presentation information to the communication section 21. The communication section 21 transmits the presentation information to the communication device main body 50A. In the case where these processes are performed, it is possible for the processes of the above described steps S140 to S150 to be omitted. Further, it is possible for the process of the above described step S60 to also be omitted.

In step S140, the control section 23 determines whether or not request information is provided from the communication device main body 50A. In the case where it is determined that request information is provided from the communication device main body 50A, the control section 23 proceeds to step S150, and in the case where it is determined that request information is not provided from the communication device main body 50A, the control section 23 ends the present process. On the other hand, in the case where request information is received from the communication device main body 50A, the communication section 21 outputs the request information from the control section 23.

In step S150, the control section 23 acquires the outlet ID from the request information, and acquires the presentation information corresponding to this outlet ID from the storage section 22. Then, the control section 23 transmits the presentation information to the communication section 21. The communication section 21 transmits the presentation information to the communication device main body 50A.

In step S160, the control section 23 determines whether or not connection release information is provided from the communication device main body 50A. In the case where connection release information is provided from the communication device main body 50A, the control section 23 proceeds to step S170, and in the case where connection release information is not provided from the communication device main body 50A, the control section 23 ends the present process.

In step S170, the control section 23 acquires the device ID from the connection release information, and deletes the entry information corresponding to this ID from the storage section 22. After this, the control section 23 ends the present process. After this, the control section 23 returns the setting of the wireless LAN router to the initial state. Note that the control section 23 may return the setting of the wireless LAN router to the initial state after a prescribed amount of time has elapsed after deleting the entry information. Further, from the viewpoint of retaining history, the control section 23 may include a flag such as "invalid" in the entry information, without deleting the entry information.

In the first embodiment as described above, since the information processing system 10 transmits, to the communication device 50, connection device information related to the connection device 40, connection device information related to the connection device 40 can be provided to a user of the communication device 50.

Further, since the connection device 40 is the outlet 100A, the information processing system 10 can provide the user with connection device information related to the outlet 100A.

Further, power line communication is possible between the outlet 100A and the communication device 50 (specifically, the plug 200A), and the outlet 100A acquires a device ID from the communication device 50 by power line communication. Therefore, the outlet 100A can more surely acquire the device ID.

Further, since at least one of the outlet ID and presentation information are included in the connection device information, the information processing system 10 can provide the user with this information.

Further, in the case where second entry information is provided, which has an outlet ID in common with first entry information and a device ID different from the first entry information, the server 20 deletes the first entry information from the storage section 22. Therefore, the server 20 can understand in real time the type of communication device 50 connected to the outlet 100A.

Further, since the outlet 100A transmits, to the server 20, entry information in which the outlet ID and device ID are associated with each other, the server 20 can understand in real time the type of communication device 50 connected to the outlet 100A.

Further, since the outlet 100A transmits the entry information to the server 20 after a prescribed amount of time has elapsed after the communication device 50 is connected to the outlet 100A, the server 20 can receive the entry information at a time after the time when the communication device 50 detects the connection with the outlet 100A.

Further, the communication device 50 transmits the device ID to the outlet 100A when connected to the outlet 100A. Further, the communication device 50 receives the presentation information transmitted from the server 20. Therefore, the communication device 50 can provide the presentation information to the user.

Further, the communication device 50 detects that the plug 200A is connected to the outlet 100A, and after this detection is performed, requests the outlet ID or the like from the server 20. Therefore, the communication device 50 can more surely acquire an effective outlet ID (that is, an ID showing the outlet 100A to which the plug 200A is presently connected).

Further, since the communication device 50 determines whether or not the outlet ID is effective, based on the reception time and the detection time, the communication device 50 can more surely determine whether or not the outlet ID is effective.

Further, since the communication device 50 determines whether or not the outlet ID is effective in the case where the reception time is a time after the detection time, the communication device 50 can more surely determine whether or not the outlet ID is effective.

Further, since the communication device 50 determines whether or not the outlet ID is effective in the case where the reception time is a prescribed amount of time prior to the detection time, the communication device 50 can more surely determine whether or not the outlet ID is effective.

<2. The Second Embodiment>

Figure 15:
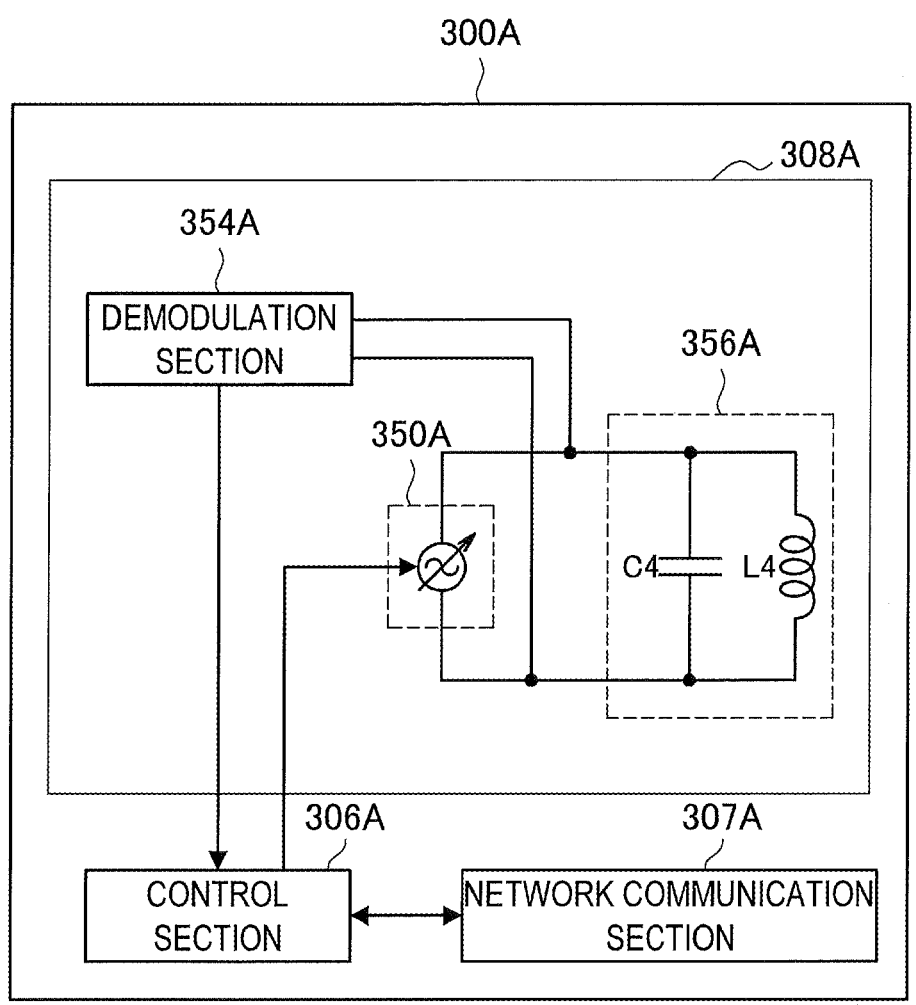
FIG. 15 is a block diagram which shows a configuration of a connection device according to a second embodiment of the present disclosure.
Figure 16:
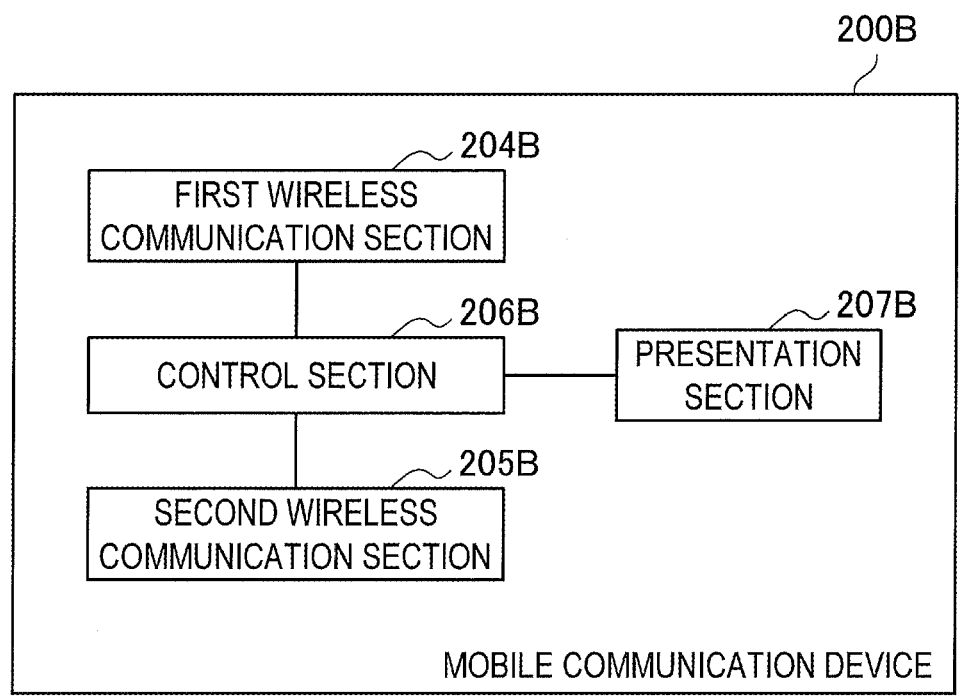
FIG. 16 is a block diagram which shows a configuration of a communication device.

Next, a second embodiment will be described. The entire configuration of the information processing system 10 according to the second embodiment is similar to that of the first embodiment. However, in the second embodiment, the connection device 40 is a non-contact (wireless transmission type) connection device 300A, which is shown in FIG. 15, and the communication device 50 is a mobile communication device 200B, which is shown in FIG. 16. The connection device 300A is, for example, an automatic vending machine or the like, and the mobile communication device 200B is, for example, a mobile phone or the like.

[2-1. Configuration of the Server]

First, the configuration of the server 20 will be described. The server 20 has a configuration similar to that of the first embodiment. However, the server 20 stores a connection device ID instead of the outlet ID. Further, information related to the products sold by a connection device 300A is included in the presentation information.

[2-2. Configuration of the Connection Device]

First, the configuration of the connection device 300A will be described based on FIG. 15. The connection device 300A is, for example, an automatic vending machine or the like, and includes a control section 306A, a network communication section (transmission section) 307A, and a wireless communication section 308A, as shown in FIG. 15. The control section 306A includes an integrated circuit or the like in which an MPU (Micro Processing Unit) and various processing circuits are integrated, and controls each section of the connection device 300A. More specifically, the control section 306A transmits, for example, a high frequency signal generation instruction and a high frequency signal transmission suspension instruction to the wireless communication section 308A, and performs various types of processes, based on a high frequency response signal transmitted from the wireless communication section 308A. The network communication section 307A is similar to the network communication section 107A of the first embodiment.

The wireless communication section 308A wirelessly communicates with a second wireless communication section 205B of the mobile communication device 200B, and functions as a reader/writer (or interrogator) in NFC or the like. The wireless communication section 308A specifically includes a high frequency signal generation section 350A, a demodulation section 354A, and a high frequency transmission/reception section 356A. The wireless communication section 308A may further include, for example, an encryption circuit (not shown in the figures), a communication collision avoidance (anti-collision) circuit or the like.

The high frequency signal generation section 350A receives, for example, the high frequency signal generation instruction transmitted from the control section 306A, and generates a high frequency signal in accordance with the high frequency signal generation instruction. Further, the high frequency signal generation section 350A receives the high frequency signal transmission suspension instruction, which shows a transmission suspension of the high frequency signal, for example, transmitted from the control section 306A, and suspends the generation of the high frequency signal.

Here, while FIG. 15 shows an alternating current power source as the high frequency signal generation section 350A, the high frequency signal generation section 350A according to the present embodiment is not limited to that described above. For example, the high frequency signal generation section 350A according to the present embodiment can include a modulation circuit (not shown in the figures) which performs ASK modulation (Amplitude Shift Keying), and an amplification circuit (not shown in the figures) which amplifies the transmission of the modulation circuit.

The demodulation section 354A performs envelope detection of an amplitude change of the voltage in an antenna end of the high frequency signal generation section 350A, and demodulates the high frequency response signal transmitted from the mobile communication device 200B, by binarizing the detected signal. Note that the demodulation method of the high frequency response signal in the demodulation section 354A is not limited to that described above, and can demodulate a response signal by using, for example, a phase change of the voltage in the antenna end of the high frequency signal generation section 350A.

The high frequency transmission/reception section 356A includes, for example, an inductor L4 (coil) with a prescribed inductance, and a capacitor C4 having a prescribed electrostatic capacity, and is included in a resonance circuit. Here, a frequency of a high frequency signal, such as 13.56 [MHz], for example, can be included as a resonance frequency of the high frequency transmission/reception section 356A. By the above described configuration, the high frequency transmission/reception section 356A can transmit the high frequency signal generated by the high frequency signal generation section 350A, or can receive the high frequency response signal transmitted from the mobile communication device 200B.

[2-3. Configuration of the Communication Device]

Figure 17:
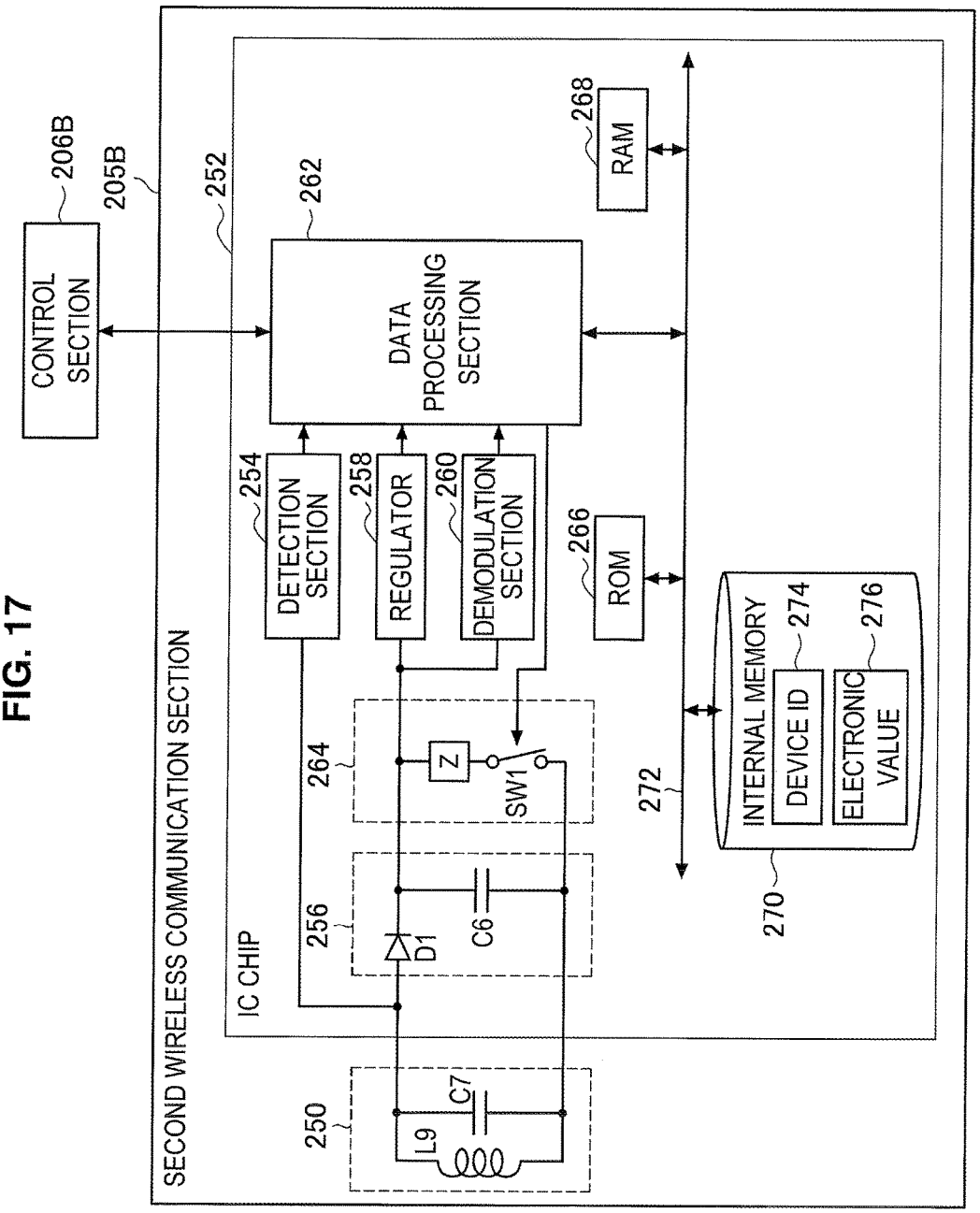
FIG. 17 is a block diagram which shows a configuration of the communication device.

Next, the configuration of the mobile communication device 200B will be described based on FIGS. 16 and 17. The mobile communication device 200B has a first wireless communication section (first communication section) 204B, a second wireless communication section (second communication section) 205B, a control section 206B, and a presentation section 207B.

The first wireless communication section 204B wirelessly communicates with the server 20. The second wireless communication section 205B transmits a device ID to the connection device 300A, by wirelessly communicating with the connection device 300A. A detailed configuration will be described later. The control section 206B performs processes similar to those of the control section 54 of the first embodiment in addition to controlling each component of the mobile communication device 200B. The presentation section 207B presents presentation information.

Next, a detailed configuration of the second wireless communication section 205B will be described based on FIG. 17. The second wireless communication section 205B has a high frequency transmission/reception section 250 added to the IC chip 252, which is shown in FIG. 11.

The high frequency transmission/reception section 250 includes, for example, an inductor L9 with a prescribed inductance, and a capacitor C7 having a prescribed electrostatic capacity, and is included in a resonance circuit. Here, a frequency of a high frequency signal, such as 13.56 [MHz], for example, can be included as a resonance frequency of the high frequency transmission/reception section 250. By the above described configuration, the high frequency transmission/reception section 250 can receive the high frequency signal transmitted from the connection device 300A, or can transmit the high frequency response signal to the connection device 300A. More specifically, the high frequency transmission/reception section 250 produces an induced voltage by electromagnetic induction in accordance with the reception of the high frequency signal, and transmits, to the IC chip 252, a reception voltage in which the induced voltage is resonating at a prescribed resonance frequency. Further, the high frequency transmission/reception section 250 transmits, to the connection device 300A, the high frequency response signal transmitted by load modulation from the IC chip 252.

Therefore, the connection device 300A and the mobile communication device 200B perform processes similar to those of the outlet 100A and plug 200A according to the first embodiment in addition to performing transmission/reception of a device ID or the like by wireless communication.

For example, the control section 306A transmits, to the wireless communication section 308A, a high frequency signal generation instruction for requesting a device ID. In response to this, the wireless communication section 308A generates a high frequency signal for requesting the device ID, and transmits this high frequency signal to the second wireless communication section 205B by wireless communication. The second wireless communication section 205B generates a high frequency response signal related to the device ID, and transmits this high frequency response signal to the wireless communication section 308A by wireless communication. The wireless communication section 308A outputs the device ID to the control section 306A. The processes after this are similar to those of the first embodiment. Note that the control section 306A may include, in the entry information, a product ID which shows the products purchased by a user using the connection device 300A. In this case, the server 20 can acquire presentation information corresponding to the product ID, from among the presentation information stored in the storage section 22, and can transmit this presentation information to the mobile communication device 200B. An effect similar to that of the first embodiment is also obtained in the second embodiment.

It should be understood by those skilled in the art that various modifications, combinations, sub-combinations and alterations may occur depending on design requirements and other factors insofar as they are within the scope of the appended claims or the equivalents thereof.

For example, while the above described embodiments show examples of an outlet and a non-contact connection device as connection devices, the connection device is not limited to these. Further, while the above described embodiments show examples of a communication device having a plug and a communication device capable of non-contact communication as a communication device connected to a connection device, the communication device is not limited to these. Further, while in the first embodiment the outlet 100A and the plug 200A perform power line communication, the outlet 100A and the plug 200A may also perform non-contact communication (wireless communication) such as that of the second embodiment.

Additionally, the present technology may also be configured as below.

1. An information processing apparatus, including:
a reception section which receives, from a connection device having a connection terminal, entry information in which connection device identification information for identifying the connection device and communication device identification information for identifying a communication device connected to the connection terminal are associated with each other;

a control section which acquires connection device information related to the connection device based on the entry information; and a transmission section which transmits the connection device information to the communication device indicated by the communication device identification information.

(2) The information processing apparatus according to (1), wherein the connection device is an outlet.

(3) The information processing apparatus according to (2), wherein power line communication for communication via a power line is possible between the connection device and the communication device, and wherein the connection device acquires the communication device identification information from the communication device by using the power line communication.

(4) The information processing apparatus according to any one of (1) to (3), wherein at least one of the connection device identification information and presentation information presented to the communication device is included in the connection device information.

(5) The information processing apparatus according to any one of (1) to (4), wherein in a case where first entry information is stored in a storage section, and thereafter second entry information is provided having connection device identification information in common with the first entry information and communication device identification information different from the first entry information, the control section deletes the first entry information from the storage section.

(6) A connection device, including:

a connection terminal; and a transmission section which transmits, to an information processing apparatus, entry information in which connection device identification information for identifying the connection device and communication device identification information for identifying a communication device connected to the connection terminal are associated with each other.

(7) The connection device according to (6), wherein the transmission section transmits the entry information to the information processing apparatus after a prescribed amount of time has elapsed since the communication device is connected to the connection terminal.

(8) A communication device, including:

a second connection terminal capable of connecting to a first connection terminal of a connection device;

a first communication section which transmits, to the connection device, communication device identification information for identifying the communication device when the second connection terminal is connected to the first connection terminal; and a second communication section which receives, from an information processing apparatus, connection device information related to the connection device.

(9) The communication device according to (8), further including:

a control section which detects that the second connection terminal is connected to the first connection terminal, and requests the connection device information from the information processing apparatus after a detection time when the detection is performed.

(10) The communication device according to (9), wherein the connection device transmits, to the information processing apparatus, entry information in which connection device identification information for identifying the connection device and the communication device identification information are associated with each other, wherein the information processing apparatus includes, in the connection device information, a reception time when the entry information is received, and wherein the control section determines whether or not the connection device information is effective based on the reception time included in the connection device information, the detection time, and a prescribed condition.

(11) The communication device according to (10), wherein a condition in which the reception time is later than the detection time is included in the prescribed condition.

(12) The communication device according to (10) or (11), wherein a condition in which the reception time is a prescribed amount of time prior to the detection time is included in the prescribed condition.

(13) An information processing method, including:

receiving, from a connection device having a connection terminal, entry information in which connection device identification information for identifying the connection device and communication device identification information for identifying a communication device connected to the connection terminal are associated with each other;

acquiring connection device information related to the connection device based on the entry information; and transmitting the connection device information to the communication device indicated by the communication device identification information.

(14) A program for causing a computer to implement:

a reception function which receives, from a connection device having a connection terminal, entry information in which connection device identification information for identifying the connection device and communication device identification information for identifying a communication device connected to the connection terminal are associated with each other;

a control function which acquires connection device information related to the connection device based on the entry information; and a transmission function which transmits the connection device information to the communication device indicated by the communication device identification information.

The present disclosure contains subject matter related to that disclosed in Japanese Priority Patent Application JP 2012-119601 filed in the Japan Patent Office on May 25, 2012, the entire content of which is hereby incorporated by reference.

What is claimed is:

1. An information processing apparatus, comprising:
a processing device and a memory device encoded with computer-executable instructions that, when executed by the processing device, are configured to:
receive, from a connection device having a connection terminal, entry information in which connection device identification information for identifying the connection device and communication device identification information for identifying a communication device connected to the connection terminal are associated with each other;
acquire connection device information related to the connection device based on the entry information, wherein, in a case where first entry information is stored in a storage section, and thereafter second entry information is received having connection device identification information in common with the first entry information and communication device identification information different from the first entry information, an invalid flag is set in the first entry information and the second entry information is stored in the storage section; and transmit the connection device information to the communication device indicated by the communication device identification information, wherein the connection device comprises an outlet and the communication device comprises a plug that can be inserted into the outlet and wherein the connection device information transmitted to the communication device includes the connection device identification information and presentation information associated with the connection device identification information.

2. The information processing apparatus according to claim 1, wherein power line communication for communication via a power line is possible between the connection device and the communication device, and wherein the connection device acquires the communication device identification information from the communication device by using the power line communication.

3. An information processing method, comprising:

receiving, from a connection device having a connection terminal, entry information in which connection device identification information for identifying the connection device and communication device identification information for identifying a communication device connected to the connection terminal are associated with each other;

acquiring, by a control section, connection device information related to the connection device based on the entry information, wherein, in a case where first entry information is stored in a storage section, and thereafter second entry information is received having connection device identification information in common with the first entry information and communication device identification information different from the first entry information, the control section sets an invalid flag in the first entry information and stores the second entry information in the storage section; and transmitting the connection device information to the communication device indicated by the communication device identification information, wherein the connection device comprises an outlet and the communication device comprises a plug that can be inserted into the outlet and wherein the connection device information transmitted to the communication device includes the connection device identification information and presentation information associated with the connection device identification information.

4. A non-transitory computer-readable storage device encoded with computer-executable instructions that, when executed by a processing device, implement:

a reception function which receives, from a connection device having a connection terminal, entry information in which connection device identification information for identifying the connection device and communication device identification information for identifying a communication device connected to the connection terminal are associated with each other;

a control function which acquires connection device information related to the connection device based on the entry information, wherein, in a case where first entry information is stored in a storage section, and thereafter second entry information is received having connection device identification information in common with the first entry information and communication device identification information different from the first entry information, the control function sets an invalid flag in the first entry information and stores the second entry information in the storage section; and a transmission function which transmits the connection device information to the communication device indicated by the communication device identification information, wherein the connection device comprises an outlet and the communication device comprises a plug that can be inserted into the outlet and wherein the connection device information transmitted to the communication device includes the connection device identification information and presentation information associated with the connection device identification information.

* * * * *